(12) United States Patent
Kawakami et al.

(10) Patent No.: US 12,316,194 B2
(45) Date of Patent: May 27, 2025

(54) ROTARY ELECTRIC MACHINE

(71) Applicant: TOYOTA JIDOSHA KABUSHIKI KAISHA, Toyota (JP)

(72) Inventors: Jun Kawakami, Anjo (JP); Takashi Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 18/187,364

(22) Filed: Mar. 21, 2023

(65) Prior Publication Data
US 2023/0318399 A1    Oct. 5, 2023

(30) Foreign Application Priority Data

Mar. 29, 2022 (JP) ................. 2022-054459

(51) Int. Cl.
*H02K 5/24* (2006.01)
*H02K 11/225* (2016.01)
*H02K 21/16* (2006.01)
*H02K 24/00* (2006.01)

(52) U.S. Cl.
CPC ............ *H02K 5/24* (2013.01); *H02K 11/225* (2016.01); *H02K 21/16* (2013.01); *H02K 24/00* (2013.01)

(58) Field of Classification Search
CPC ........ H02K 3/487; H02K 3/24; H02K 5/1282; H02K 5/128; H02K 5/08; H02K 9/197
See application file for complete search history.

(56) References Cited

U.S. PATENT DOCUMENTS

| | | | | |
|---|---|---|---|---|
| 2,428,816 | A * | 10/1947 | Sigmund | H02K 3/44 310/86 |
| 7,986,070 | B2 * | 7/2011 | Baudelocque | H02K 5/1282 310/43 |
| 2003/0057797 | A1 * | 3/2003 | Kaneko | H02K 5/128 310/216.064 |
| 2018/0115222 | A1 * | 4/2018 | Lassila | H02K 1/165 |

FOREIGN PATENT DOCUMENTS

| | | |
|---|---|---|
| JP | 2010-041770 A | 2/2010 |
| JP | 2014-023387 A | 2/2014 |
| JP | 2021-078226 A | 5/2021 |

* cited by examiner

*Primary Examiner* — Leda T Pham
(74) *Attorney, Agent, or Firm* — Sughrue Mion, PLLC

(57) ABSTRACT

A rotary electric machine including a stator and a rotor. The stator includes: (a) a stator core provided with a plurality of teeth are spaced apart by a plurality of voids; (b) a plurality of coils which are wound on the teeth, and which are disposed in the voids, and (c) a plurality of mold resin portions which fill the voids, and which cover the coils. The mold resin portions have respective resin surfaces which are substantially flush with protruding surfaces of the respective teeth, and which cooperate with the protruding surfaces to constitute an inner circumferential surface of the stator. At least some of the mold resin portions have grooves which are provided in the resin surfaces thereof, and which extend in an axial direction parallel to the axis.

3 Claims, 6 Drawing Sheets

ROTARY ELECTRIC MACHINE

This application claims priority from Japanese Patent Application No. 2022-054459 filed on Mar. 29, 2022, the disclosure of which is herein incorporated by reference in its entirety.

FIELD OF THE INVENTION

The present invention relates to a rotary electric machine, more particularly, to a rotary electric machine including a stator in which voids between teeth are filled with resin material.

BACKGROUND OF THE INVENTION

There is known a rotary electric machine including a tubular-shaped stator, and a rotor that is disposed on an inner peripheral side of the stator and is coaxial with the stator, such that the rotor is rotatable about an axis. For example, the stator includes: (a) a tubular-shaped stator core provided with a plurality of teeth which protrude toward the inner peripheral side, and which are arranged in a circumferential direction about the axis, such that each adjacent two of the teeth, which are adjacent to each other in the circumferential direction, are spaced apart from each other by a corresponding one of a plurality of voids, (b) a plurality of coils which are wound on the teeth, and which are disposed in the voids, and (c) a plurality of mold resin portions which fill the voids, and which cover the coils, wherein the mold resin portions have respective resin surfaces which are substantially flush with protruding surfaces of the respective teeth, and which cooperate with the protruding surfaces to constitute an inner circumferential surface of the stator. JP-2021-78226A discloses an example of such a stator, wherein the voids are provided with the mold resin portions in the form of support members made of foam resin material or the like. Further, in the stator disclosed in this Japanese Patent Application Publication, a state core is provided with distribution holes through which a coolant fluid is to be discharge, for thereby reducing loss (hereinafter referred to as "dragging loss") caused by dragging rotation of the rotor due to retention of the coolant fluid.

SUMMARY OF THE INVENTION

However, the provision of the distribution holes in the stator core could impede magnetic flux flow, thereby causing torque reduction or the like due to reduction of efficiency of the rotary electric machine. Not only electric motors but also electric power generators have similar problems.

The present invention was made in view of the background art described above. It is therefore an object of the present invention to reduce the dragging loss by assuring a sufficient amount of distribution of the coolant fluid without provision of the distribution holes in the stator core.

The object indicated above is achieved according to the following aspects of the present invention.

According to a first aspect of the invention, there is provided a rotary electric machine including a tubular-shaped stator; and a rotor that is disposed on an inner peripheral side of the stator and is coaxial with the stator, such that the rotor is rotatable about an axis. The stator includes: a tubular-shaped stator core provided with a plurality of teeth which protrude toward the inner peripheral side, and which are arranged in a circumferential direction about the axis, such that each adjacent two of the teeth, which are adjacent to each other in the circumferential direction, are spaced apart from each other by a corresponding one of a plurality of voids that are arranged in the circumferential direction; a plurality of coils which are wound on the teeth, and which are disposed in the voids, and a plurality of mold resin portions which fill the voids, and which cover the coils. The mold resin portions have respective resin surfaces which are substantially flush with protruding surfaces of the respective teeth, and which cooperate with the protruding surfaces to constitute an inner circumferential surface of the stator. At least some of the mold resin portions have grooves which are provided in the resin surfaces thereof, and which extend in an axial direction parallel to the axis.

It is noted that each of the grooves is a recess that is recessed toward an outer peripheral side of the stator, from a virtual surface (defined by a curved line or bent line in a cross section perpendicular to the axial direction) that is obtained by virtual extensions of the protruding surfaces of the teeth.

According to a second aspect of the invention, in the rotary electric machine according to the first aspect of the invention, a number of the grooves provided in the resin surfaces of the respective mold resin portions is different from a number of the teeth provided in the stator core.

According to a third aspect of the invention, in the rotary electric machine according to the first or second aspect of the invention, the resin surfaces of the respective mold resin portions include at least two resin surfaces that are different from each other in terms of a number of the grooves provided in each of the at least two resin surfaces.

According to a fourth aspect of the invention, in the rotary electric machine according to the any one of the first through third aspects of the invention, the rotor is supported by a support member such that the rotor is rotatable about the axis and such that a resolver is provided between the support member and the rotor in the axial direction. The support member is provided with a cylindrical-tubular-shaped resolver holder which protrudes toward the rotor such that a resolver stator of the resolver is held in a predetermined position by the resolver holder. The cylindrical-tubular-shaped resolver holder is provided with a plurality of slits which are arranged in the circumferential direction about the axis and which extend in the axial direction. Each of at least one of the slits is located in a position coincident with at least one of the grooves in the circumferential direction about the axis.

In the rotary electric machine according to any one of the first through fourth aspects of the invention, at least some of the mold resin portions, which fill the voids of the stator core, have the grooves which are provided in the resin surfaces thereof, and which extend in an axial direction parallel to the axis. Owing to the grooves, it is possible to assure a sufficient cross section between an outer circumferential surface of the rotor and the inner circumferential surface of the stator, and to cause a coolant fluid to be smoothly distributed through the grooves in directions parallel to the axial direction, thereby reducing the dragging loss due to retention of the coolant fluid. Further, since the provision of the grooves eliminates necessity of provision of distribution holes in the stator core for discharging the coolant fluid, there is no risk that magnetic flux flow would be impeded, so that efficiency of the rotary electric machine is satisfactorily maintained.

In the rotary electric machine according to the second aspect of the invention, the number of the grooves provided in the resin surfaces of the respective mold resin portions is different from the number of the teeth provided in the stator core, so that occurrences of vibrations and noises are suppressed. Depending on presence or absence of the grooves, a pressure difference occurs in the coolant fluid, and the pressure difference causes a rotation fluctuation of the rotor. Meanwhile, the rotary electric machine has a torque fluctuation that is dependent on the number of the teeth. There is a possibility that the rotation fluctuation caused by the torque fluctuation and the rotation fluctuation caused by the pressure difference would synchronize and resonate, and the vibrations and the noises would be increased. However, in the rotary electric machine according to the second aspect of the invention, since the number of the grooves and the number of the teeth are different from each other, the occurrences of the vibrations and the noises are suppressed.

In the rotary electric machine according to the third aspect of the invention, at least two of the resin surfaces of the respective mold resin portions are different from each other in terms of the number of the grooves provided in each of the at least two resin surfaces. Therefore, the rotation fluctuation of the rotor, which is caused by the pressure difference of the coolant fluid that occurs depending on the presence or absence of the grooves, becomes irregular, so that the resonance of the rotation fluctuation caused by the pressure difference with the rotation fluctuation caused by the torque fluctuation is suppressed whereby the occurrences of the vibrations and the noises are suppressed.

In the rotary electric machine according to the fourth aspect of the invention, the support member is provided with the resolver holder by which the resolver stator is held in the predetermined position, and each of at least one of the slits provided in the resolver holder is located in the position coincident with at least one of the grooves in the circumferential direction about the axis. Thus, the coolant fluid, which is distributed through the grooves in directions parallel to the axial direction, is discharged into the slits, whereby the retention of the coolant fluid is suppressed and accordingly the dragging loss is appropriately reduced.

DETAILED DESCRIPTION OF PREFERRED EMBODIMENTS

The rotary electric machine is referred also to as a rotating machine, and may be an electric motor, an electric power generator, or a motor generator that can be used selectively as the electric motor or the electric power generator. The rotating electric machine is, for example, a three-phase AC synchronous motor of permanent-magnet embedded type. The present invention is advantageously applied to a rotary electric machine for an electrically operated vehicle, which is to be used as a drive power source for driving the electrically operated vehicle such as an electric vehicle and a hybrid electric vehicle. However, the present invention is applicable also to any one of various kinds of rotary electric machines such as an electric power generator for a series-type hybrid electric vehicle and also an electric motor and an electric power generator that are to be used for a device or machine other than a vehicle. Each of the grooves provided in the resin surfaces of the mold resin portions may have any cross sectional shape such as V shape, U shape, arc shape and rectangular shape. The number of the grooves provided in each of the resin surfaces of the mold resin portion is preferably two or less, but may be three or more.

Embodiments

There will be described embodiments of the present invention in details with reference to drawings. It is noted that figures of the drawings are simplified or deformed as needed, and each portion is not necessarily precisely depicted in terms of dimension ratio, shape, angle, etc.

Figure 1:
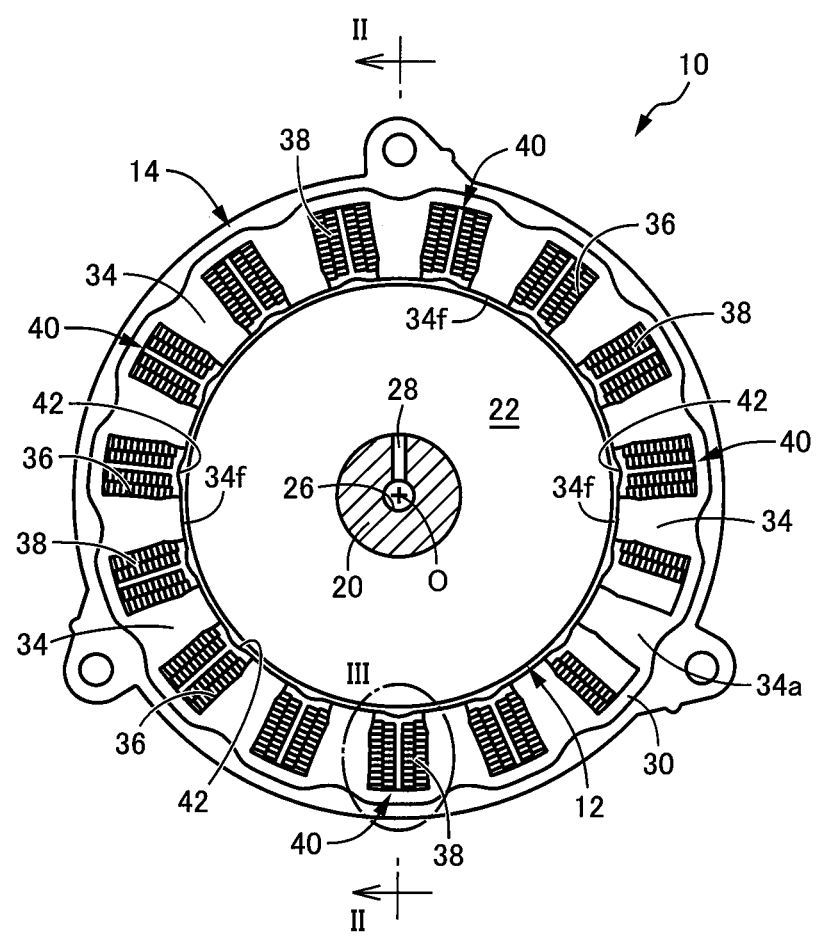
FIG. 1 is a cross sectional view for schematically explaining a rotary electric machine as an embodiment of the present invention, wherein the cross sectional view is taken in a plane perpendicular to an axis O.
Figure 2:
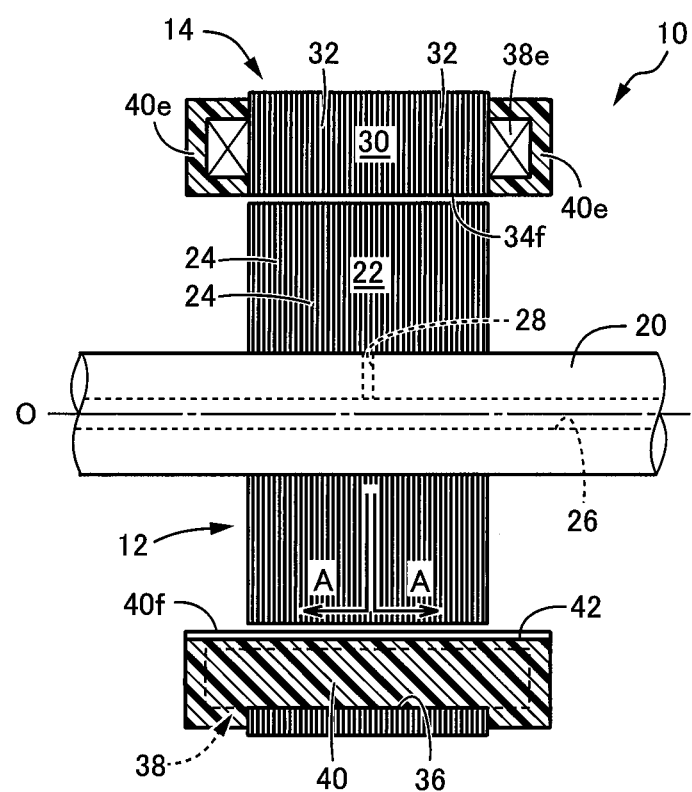
FIG. 2 is a cross sectional view seen along arrows II-II shown in FIG. 1 and taken in a plain containing the axis O.

FIG. 1 is a cross sectional view for schematically explaining a rotary electric machine 10 as an embodiment of the present invention, wherein the cross sectional view is taken in a plane perpendicular to an axis O. FIG. 2 is a cross sectional view seen along arrows II-II shown in FIG. 1 and taken in a plain containing the axis O. The rotary electric machine 10 is a three-phase AC synchronous motor of permanent-magnet embedded type, serving as a motor generator that can be used selectively as an electric motor or an electric power generator. The rotary electric machine 10 is advantageously used as a drive power source of an electric vehicle such as a hybrid electric vehicle, for example. The rotary electric machine 10 includes a rotor 12 and a stator 14 that are coaxial with the axis O. In the following description, the axis O of the rotary electric machine 10 is also used to refer to an axis of the rotor 12, an axis of the stator 14 and an axis of a rotor shaft 20.

The rotor 12 includes the above-described rotor shaft 20, a cylindrical tubular-shaped rotor core 22 attached onto an outer circumferential surface of the rotor shaft 20, and permanent magnets (not shown) embedded in the rotor core 22. The rotor 12 is held through the rotor shaft 20 in a casing (not show), rotatably about the axis O. The rotor core 22 is constituted by a multiplicity of annular-shaped steel plates 24 that are laminated in an axial direction, i.e., a direction parallel to the axis O, with each of the steel plates 24 being in an attitude perpendicular to the axis O. The rotor core 22 is fixed to the rotor shaft 20 through screw members or the like (not shown). The rotor shaft 20 is provided an axially-extending distribution hole 26 and a radially-extending distribution hole 28 through which a coolant fluid is to be distributed. The axially-extending distribution hole 26 is located in the axis O and extends in the axial direction. The radially-extending distribution hole 28 is in communication with the axially-extending distribution hole 26, and extends in the radial direction outwardly from the axis O so as to open in the outer circumferential surface of the rotor shaft 20 onto which the rotor core 22 is attached. Thus, the coolant fluid supplied to the axially-extending distribution hole 26 is to be caused to flow through the radially-extending distribution hole 28 outwardly from the rotor shaft 20 so as to be supplied to the rotor core 22. The coolant fluid supplied to the rotor core 22 is to be distributed to an outer circumferential surface of the rotor 12 through gaps between the multiplicity of the steel plates 24 of the rotor core 22, for example, owing to a centrifugal force. However, the rotor core 22 may be provided with a radially-extending distribution hole or holes, as needed.

The stator 14 includes a tubular-shaped stator core 30 disposed on an outer peripheral side on the rotor 12. The stator core 30 is constituted by a multiplicity of annular-shaped steel plates 32 that are laminated in the axial direction, i.e., the direction parallel to the axis O, with each of the steel plates 32 being in an attitude perpendicular to the axis O. The stator core 30 is press-fitted in a casing (not shown) or is fixed to the casing through screw bolts or the like (not shown). The stator core 30 is provided with a plurality of teeth 34 which protrude toward the inner peripheral side, and which are arranged in a circumferential direction about the axis O, such that each adjacent two of the teeth 34, which are adjacent to each other in the circumferential direction, are spaced apart from each other by a corresponding one of a plurality of voids 36. The plurality of teeth 34 consist of 15 teeth 34 in the present embodiment. The teeth 34 extend in parallel to the axis O throughout an entire length of the stator core 30 in the axial direction. The voids 36 extend through the stator core 30 in the axial direction. The stator 14 further includes a plurality of coils 38 which are wound on the teeth 34. In the present embodiment, the coils 38 are wound on 14 teeth 34 while not being wound on one tooth 34a that is located in lower right portion of FIG. 1. The coils 38 wound on the teeth 34 are disposed to be received in the voids 36. The stator 14 still further includes a plurality of mold resin portions 40 which fill the voids 36 and which cover the coils 38. The mold resin portions 40 are made of epoxy resin or other resin material having insulation property. The coils 38 are fixed to the stator core 30 by the mold resin portions 40 that cover the coils 38.

Figure 3:
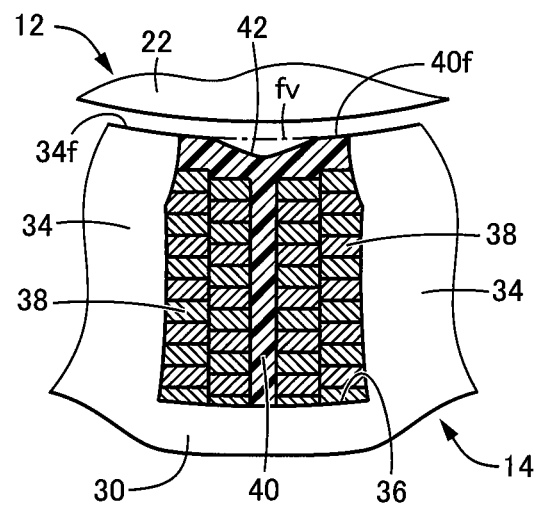
FIG. 3 is a cross sectional view showing, in enlargement, a part III shown in FIG. 1.

FIG. 3 is a cross sectional view showing, in enlargement, a part III shown in FIG. 1. As shown in FIG. 3, the mold resin portions 40 are provided to cover openings of the respective voids 36, and have respective resin surfaces 40f which are substantially flush with protruding surfaces 34f of the respective teeth 34, and which cooperate with the protruding surfaces 34f to constitute an inner circumferential surface of the stator 14. The protruding surfaces 34f may be referred also to as "inner-peripheral-side end surfaces" of the respective teeth 34. In the present embodiment, the protruding surfaces 34f of the respective teeth 34 cooperate with one another to constitute a cylindrical surface whose center lies on the axis O. The resin surface 40f of each of the mold resin portions 40 has end portions which are opposite to each other in the circumferential direction and which are adjacent to corresponding two of the teeth 34, wherein the end portions of the resin surface 40f lie on the above-described cylindrical surface whose center lies on the axis O. The mold resin portions 40 include coil-end cover portions 40e formed integrally with the mold resin portions 40. The coil-end cover portions 40e cover coil ends 38e in which the coils 38 protrude outwardly from the stator core 30 in directions parallel to the axial direction, as shown in FIG. 2. It is noted that hatchings representing cross sections of the coils 38 and the mold resin portions 40 are not provided in the view of FIG. 1, as well as in those of FIGS. 5, 7 and 8 that correspond to the view of FIG. 1.

An inside diameter of the stator 14, i.e., a diameter defined by the protruding surfaces 34f of the teeth 34, is slightly larger than an outside diameter of the rotor 12, so that a slight clearance is defined between the outer circumferential surface of the rotor 12 and the inner circumferential surface of the stator 14. Therefore, the coolant fluid, which is supplied to the rotor core 22 through the axially-extending distribution hole 26 and the radially-extending distribution hole 28 of the rotor shaft 20 and is then caused to flow out onto the outer circumferential surface of the rotor 12 through the rotor core 22, owing to the centrifugal force, for example, is caused to pass through the above-described slight clearance so as to be discharged in directions parallel to the axial direction of the rotary electric machine 10. However, if a size of the slight clearance is too small, a sufficient amount of the coolant fluid cannot flow, so that the dragging loss could be increased as a result of retention of the coolant fluid. Therefore, in the present embodiment, the resin surfaces 40f of the mold resin portions 40, which defines the inner circumferential surface of the stator 14, have grooves 42 extending in the axial direction parallel to the axis O, so as to facilitate the coolant fluid to flow.

Described specifically, the mold resin portions 40 are provided to fill all of the voids 36 between the teeth 34, and each of all of the resin surfaces 40f covering the openings of the voids 36 is provided with a corresponding one of the grooves 42 that extend in the axial direction parallel to the axis O for distributing the coolant fluid. As shown in FIG. 3 showing the cross section perpendicular to the axis O, each of the grooves 42 is a recess that is recessed outwardly in the radial direction, from a virtual surface (i.e. cylindrical surface whose center lies on the axis O) fv that is defined by virtual extensions of the protruding surfaces 34f of the teeth 34 to parts of the voids 36. In the present embodiment, each groove 42 has a V shape in the cross section perpendicular to the axis O. Each groove 42 has a length that is larger than at least an entire axial length of the rotor 12 that is shown in FIG. 2, so as to extend beyond opposite ends of the rotor 12 that are opposite in the axial direction. In the present embodiment, each groove 42 extends throughout the axial length of the stator 14 including the coil-end cover portions 40e that cover the coil ends 38e. Where the mold resin portions 40 are injection-molded, for example, by injecting the resin material into all of the voids 36 in which the coils 38 are disposed, all of the grooves 42 can be formed concurrently with each other in the respective resin surfaces 40f of the mold resin portions 40 located between the teeth 34 in the circumferential direction, by using an injection mold having a mold surface in which protrusions are provided, wherein the protrusions have triangular cross-sectional shape corresponding to the V-shaped cross-sectional shapes of the grooves 42.

In the rotary electric machine 10 according to the present embodiment, all of the mold resin portions 40, which fill the voids 36 of the stator core 30, have the grooves 42 which are provided in the resin surfaces 40f thereof, and which extend in an axial direction. Owing to the grooves 42, it is possible to assure a sufficient cross section between the outer circumferential surface of the rotor 12 and the inner circumferential surface of the stator 14, and to cause the coolant fluid (supplied from the rotor shaft 20 to flow out to the outer circumferential surface of the rotor 12 through the gaps between the multiplicity of the steel plates 24 of the rotor core 22, for example, owing to the centrifugal force, as indicated by arrows A in FIG. 2) to be smoothly distributed through the grooves 42 in directions parallel to the axial direction, thereby reducing the dragging loss due to retention of the coolant fluid. Further, since the provision of the grooves eliminates necessity of provision of distribution holes (that are disclosed in the above-identified Japan Patent Application Publication) in the stator core 30 for discharging the coolant fluid, there is no risk that magnetic flux flow would be impeded, so that efficiency of the rotary electric machine 10 is satisfactorily maintained.

Further, in the present embodiment, the resin surfaces 40f of all of the respective 15 mold resin portions 40 are provided with the grooves 42 so that a sufficient amount of the coolant fluid can be distributed whereby the retention of the coolant fluid can be appropriately suppressed. Further, in the present embodiment, the mold resin portions 40 are injection-molded by concurrently injecting the resin material into all of the voids 36. Therefore, the grooves 42 can be formed in the respective resin surfaces 40f of the mold resin portions 40 by using the injection mold having the mold surface in which the protrusions are provided, wherein the protrusions have the triangular cross-sectional shape corresponding to the V-shaped cross-sectional shapes of the grooves 42. Thus, the mold resin portions 40 can be easily formed without increase of cost, and a required amount of the resin material is reduced by provision of the grooves 42 whereby a required cost for the material is reduced.

In the above-identified Japanese Patent Application Publication, the distribution holes are provided in a mold resin for discharging the coolant fluid, so that it is assumed that cracks could start from the distribution holes and developed cracks could cause the mold resin to fall off. However, in the present embodiment in which simply the grooves 42 are provided in the resin surfaces 40f of the respective mold resin portions 40, the cracks and the falling-off of the mold resin portions 40 are unlikely to be caused. Further, an additional step of providing the distribution holes is not required so that increase of the manufacturing cost is suppressed.

There will be described other embodiments of this invention. The same reference signs as used in the above-described embodiment will be used in the following embodiment, to identify the practically corresponding elements, and descriptions thereof are not provided.

Figure 4:
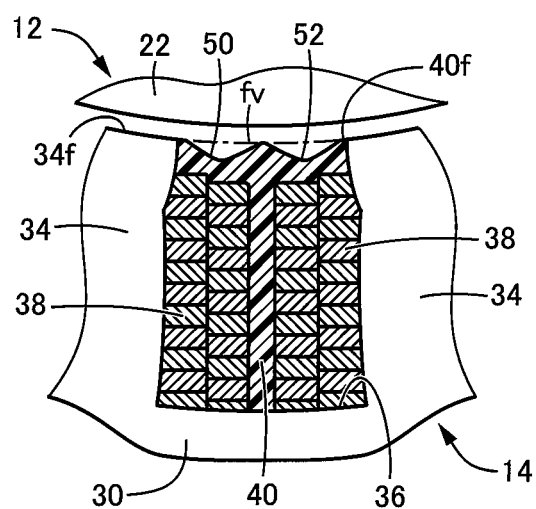
FIG. 4 is a cross sectional view for schematically explaining another embodiment of the present invention, wherein the cross sectional view corresponds to the view of FIG. 3.

FIG. 4 is a cross sectional view for schematically explaining another embodiment of the present invention, wherein the cross sectional view corresponds to the view of FIG. 3. As shown in FIG. 4, the resin surface 40f of each of the mold resin portions 40 is provided with, in place of the above-described groove 42, a pair of grooves 50, 52 extending throughout the entire axial length of the stator 14. In this embodiment, too, the discharge of the coolant fluid is facilitated by the grooves 50, 52 whereby the dragging loss due to retention of the coolant fluid is reduced. Thus, the present embodiment provides substantially the same effects as the above-described embodiment. Further, in the present embodiment, an interval between each adjacent two of the grooves 50, 52 is not constant in the circumferential direction about the axis O and the number of the grooves 50, 52 is twice as large as the number of the teeth 34, so that occurrences of vibrations and noises are suppressed. Depending on presence or absence of the grooves 50, 52, a pressure difference occurs in the coolant fluid, and the pressure difference causes a rotation fluctuation of the rotor 12. Meanwhile, the rotary electric machine 10 has a torque fluctuation that is dependent on the number of the teeth 34. There is a possibility that the rotation fluctuation caused by the torque fluctuation and the rotation fluctuation caused by the pressure difference would synchronize and resonate, and the vibrations and the noises would be increased. However, in this embodiment, the number of the grooves 50, 52 and the number of the teeth 34 are different from each other, and the interval between each adjacent two of the grooves 50, 52 is not constant in the circumferential direction, so that the occurrences of the vibrations and the noises are suppressed.

Figure 5:
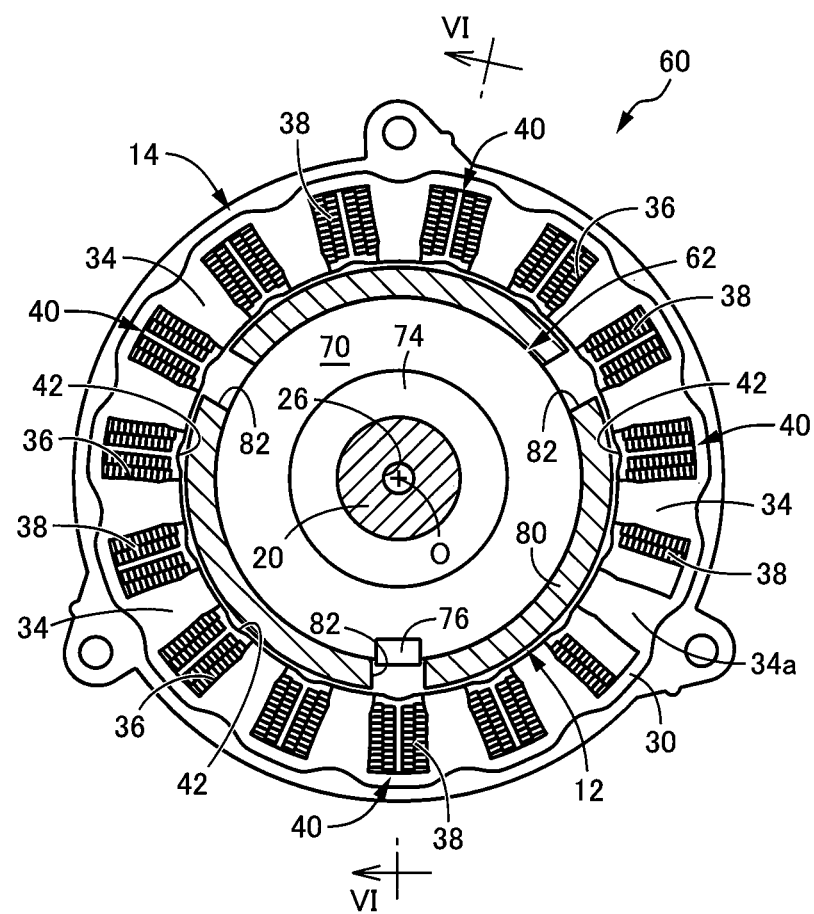
FIG. 5 is a cross sectional view for schematically explaining still another embodiment of the present invention, wherein the cross sectional view is seen along arrows V-V shown in FIG. 6 and is perpendicular to the axis O.
Figure 6:
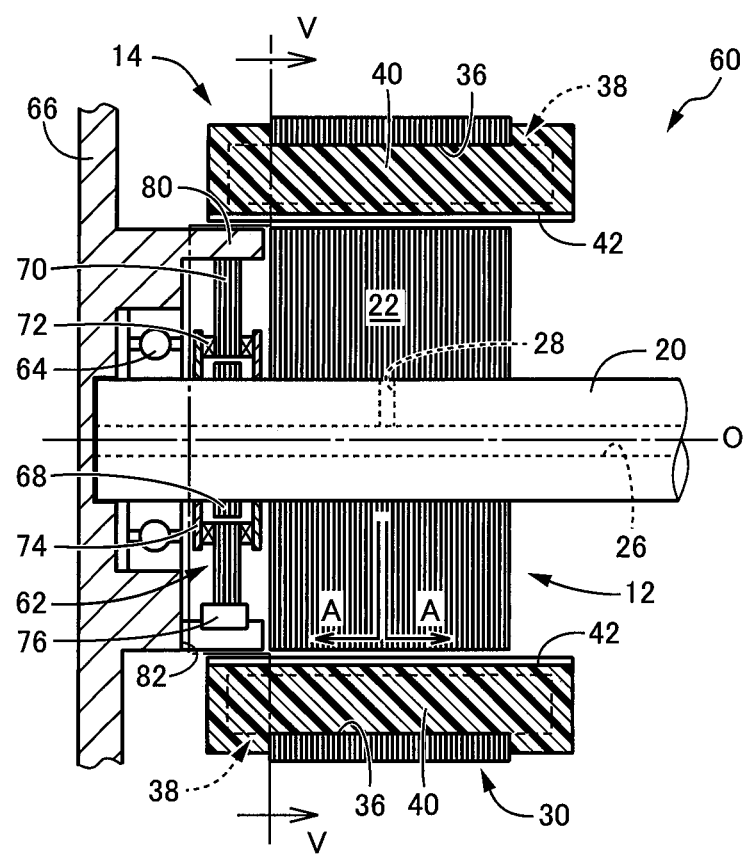
FIG. 6 is a cross sectional view seen along arrows VI-VI shown in FIG. 5 and taken in a plane containing the axis O.

FIGS. 5 and 6 are view showing still another embodiment of the present invention in which a rotary electric machine 60 includes a resolver 62 that is provided to be adjacent to the rotor 12 in the axial direction. The view of FIG. 5 is a cross sectional view seen along arrows V-V shown in FIG. 6 and perpendicular to the axis O. The view of FIG. 6 is a cross sectional view seen along arrows VI-VI shown in FIG. 5 and taken in a plane containing the axis O. The rotor 12, stator 14 and rotor shaft 20 are constructed similarly as in the above-described embodiments. The rotor shaft 20 is supported at is axial end portion by a rear cover 66 through a bearing 64, so as to be rotatable about the axis O. The rear cover 66 corresponds to "support member" recited in the appended claims, and constitutes a part of the casing (not shown) to which the stator 14 is fixed in the rotary electric machine 60. That is, the rotary electric machine 60 is a rotary electric machine having a resolver built therein.

The resolver 62 is disposed between the rear cover 66 and the rotor 12 in the axial direction, and includes a resolver rotor 68 fixed to the rotor shaft 20 and a resolver stator 70 fixed to the rear cover 66. The resolver rotor 68 includes a rotor core that is constituted by a multiplicity of annular-shaped steel plates that are laminated in the direction parallel to the axis O, with each of the steel plates being in an attitude perpendicular to the axis O. The resolver stator 70 includes a stator core that is constituted by a multiplicity of annular-shaped steel plates that are laminated in the direction parallel to the axis O, with each of the steel plates being in an attitude perpendicular to the axis O. The resolver stator 70 further includes a plurality of resolver coils 72 wound on a plurality of teeth provided in an inner circumferential surface of the stator core. The resolver coils 72 are covered by a resolver cover 74, and are connected to an external device through a connector 76.

The rear cover 66 is provided with a cylindrical-tubular-shaped resolver holder 80 which protrudes toward the rotor 12 in the axial direction such that the resolver stator 70 of the resolver 62 is held in a predetermined position by the resolver holder 80. The resolver holder 80 has an outside diameter substantially the same as an outside diameter of the rotor 12, and axially protrudes to a position close to an axial end face of the rotor 12. Therefore, as shown in an upper part (on an upper side of the axis O) of FIG. 6, the coolant fluid, which is distributed through the grooves 42 in directions parallel to the axial direction so as to be discharged outwardly of the rotor 12, could be impeded by the resolver holder 80 so as to be retained in the grooves 42. However, in this embodiment, the resolver holder 80 is provided with a plurality of slits 82 which are arranged in the circumferential direction about the axis O and which extend in the axial direction, such that each of at least one of the slits 82 is located in a position coincident with at least one of the grooves 42 in the circumferential direction about the axis O. More specifically, the plurality of slits 82 consist of three slits 82 that are arranged with an interval of 120° in the circumferential direction about the axis O, such that each of the three slits 82 is located in a position coincident with a corresponding one of the grooves 42. Each of the slits 82 opens in an axially distal end face, so that the coolant fluid, which is distributed through three of the grooves 42 located in positions coincident with the respective three slits 82, in the directions parallel to the axial direction, as indicated by arrows A, is discharged into the slits 82 (without being retained in the grooves 42), as shown in a lower part (on a lower side of the axis O) of FIG. 6.

That is, in the rotary electric machine 60 having the resolver 62 built therein according to this embodiment, the rear cover 66 is provided with the resolver holder 80 by which the resolver stator 70 is held in the predetermined position, so that the coolant fluid, which is distributed through the grooves 42 in the directions parallel to the axial direction, could be impeded by the resolver holder 80 from being discharged. However, since each of the three slits 82 provided in the resolver holder 80 is located in a position coincident with the corresponding groove 42, the coolant fluid, which is distributed through the grooves 42 in the directions parallel to the axial direction, is discharged into the slits 82, whereby the retention of the coolant fluid is suppressed in spite of presence of the resolver holder 80 and accordingly the dragging loss is appropriately reduced.

It is noted that the other grooves 42, which are other than the three grooves 42 located in the positions coincident with the respective three slits 82, also facilitate discharge of the coolant fluid. However, where a desired performance of discharge of the coolant fluid can be obtained even by only the three grooves 42 located in the positions coincident with the respective three slits 82, some or all of the other grooves 42 may be eliminated. In this case, each of the resin surfaces 40f that is not provided with the groove 42 constitutes a part of the cylindrical surface whose center lies on the axis O, as well as each of the protruding surfaces 34f of the respective teeth 34.

Figure 7:
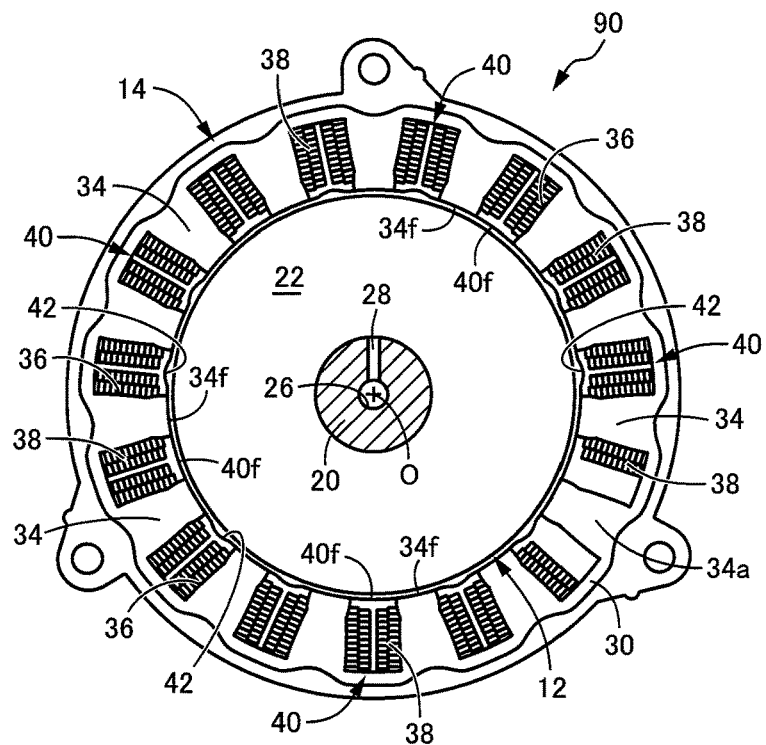
FIG. 7 is a cross sectional view for schematically explaining still another embodiment of the present invention, wherein the cross sectional view corresponds to the view of FIG. 1.

FIG. 7 is a cross sectional view corresponding to the view of FIG. 1 and showing still another embodiment of the present invention in which a rotary electric machine 90 is different from the above-described rotary electric machine 10 in that the resin surfaces 40f of some (five in this embodiment shown in FIG. 7) of the 15 mold resin portions 40 are not provided with the groove 42, so that each of the resin surfaces 40f that is not provided with the groove 42 constitutes a part of the cylindrical surface whose center lies on the axis O, as well as each of the protruding surfaces 34f of the respective teeth 34. In the rotary electric machine 90, owing to the grooves 42 provided in the resin surfaces 40f of respective ten of the mold resin portions 40, the discharge of the coolant fluid is facilitated whereby the dragging loss due to retention of the coolant fluid is reduced. Thus, this embodiment provides substantially the same effects as the above-described embodiments. Further, the number of the grooves 42 provided in the resin surface 40f of each of the mold resin portions 40 is not constant. Described specifically, one groove 42 is provided in each of the resin surfaces 40f of some of the mold resin portions 40, while no groove 42 is provided in each of the resin surfaces 40f of the other of the mold resin portions 40, so that the interval between each adjacent two of the grooves 42 is not constant in the circumferential direction about the axis O. Therefore, the rotation fluctuation of the rotor 12, which is caused by the pressure difference of the coolant fluid that occurs depending on the presence or absence of the grooves 42, becomes irregular. Further, the number of the grooves 42 and the number of the teeth 34 are different from each other, so that the resonance of the rotation fluctuation of the rotor 12 caused by the pressure difference of the coolant fluid with the rotation fluctuation caused by the torque fluctuation dependent on the number of the teeth 34 is suppressed whereby the occurrences of the vibrations and the noises are suppressed.

Figure 8:
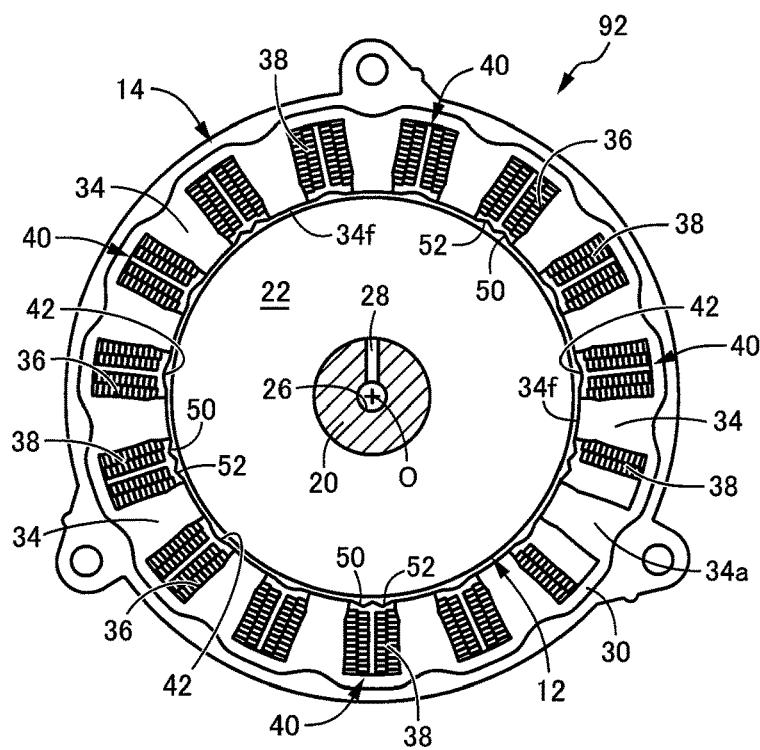
FIG. 8 is a cross sectional view for schematically explaining still another embodiment of the present invention, wherein the cross sectional view corresponds to the view of FIG. 1.

FIG. 8 is a cross sectional view corresponding to the view of FIG. 1 and showing still another embodiment of the present invention in which a rotary electric machine 92 is different from the above-described rotary electric machine 10 in that the resin surfaces 40f of some (five in this embodiment shown in FIG. 8) of the 15 mold resin portions 40 are provided with the pairs of grooves 50, 52 (that are provided in place of the grooves 42 in the embodiment shown in FIG. 4). That is, the mold resin portions 40 having the resin surfaces 40f each of which is provided with the single groove 42 and the mold resin portions 40 having the resin surfaces 40f each of which is provided with the pair of grooves 50, 52, are mixedly present in the circumferential direction about the axis O. In the rotary electric machine 92, owing to the grooves 42 provided in the resin surfaces 40f of respective ten of the mold resin portions 40 and also the grooves 50, 52 provided in the resin surfaces 40f of respective five of the mold resin portions 40, the discharge of the coolant fluid is facilitated whereby the dragging loss due to retention of the coolant fluid is reduced. Thus, this embodiment provides substantially the same effects as the above-described embodiments. Further, the number of the grooves 42 provided in the resin surface 40f of each of the mold resin portions 40 is not constant. Described specifically, one groove 42 is provided in each of the resin surfaces 40f of some of the mold resin portions 40, while two grooves 50, 52 are provided in each of the resin surfaces 40f of the other of the mold resin portions 40, so that the interval between each adjacent two of the grooves 42, 50, 52 is not constant in the circumferential direction about the axis O. Therefore, the rotation fluctuation of the rotor 12, which is caused by the pressure difference of the coolant fluid that occurs depending on the presence or absence of the grooves 42, 50, 52 becomes irregular. Further, the number of the grooves 42, 50, 52 and the number of the teeth 34 are different from each other, so that the resonance of the rotation fluctuation of the rotor 12 caused by the pressure difference of the coolant with the rotation fluctuation caused by the torque fluctuation dependent on the number of the teeth 34 is suppressed whereby the occurrences of the vibrations and the noises are suppressed.

It is noted that features shown in FIGS. 7 and 8 are applicable also to the rotary electric machine 60 having the resolver 62 built therein. In that case, each of the plurality of slits 82 of the resolver holder 80 is located in a position coincident with a corresponding one of some of the mold resin portions 40 provided with the grooves (42; 50, 52), in the circumferential direction about the axis O.

It is to be understood that the embodiments described above are given for illustrative purpose only, and that the present invention may be embodied with various modifications and improvements which may occur to those skilled in the art.

NOMENCLATURE OF ELEMENTS

10; 60; 90; 92: rotary electric machine
12: rotor
14: stator
30: stator core
34: teeth
34f: protruding surface
36: void
38: coil 40: mold resin portion
40f: resin surface
42; 50, 52: groove
62: resolver
66: rear cover (support member)
70: resolver stator
80: resolver holder
82: slit
O: axis

What is claimed is:

1. A rotary electric machine comprising:
a tubular-shaped stator; and
a rotor that is disposed on an inner peripheral side of the stator and is coaxial with the stator, such that the rotor is rotatable about an axis,
wherein the stator includes:
a tubular-shaped stator core provided with a plurality of teeth which protrude toward the inner peripheral side, and which are arranged in a circumferential direction about the axis, such that each adjacent two of the teeth, which are adjacent to each other in the circumferential direction, are spaced apart from each other by a corresponding one of a plurality of voids;
a plurality of coils which are wound on the teeth, and which are disposed in the voids, and
a plurality of mold resin portions which fill the voids, and which cover the coils,
wherein the mold resin portions have respective resin surfaces which are substantially flush with protruding surfaces of the respective teeth, and which cooperate with the protruding surfaces to constitute an inner circumferential surface of the stator, and
wherein at least some of the mold resin portions have grooves which are provided in the resin surfaces thereof, and which extend in an axial direction parallel to the axis,
wherein the rotor is supported by a support member such that the rotor is rotatable about the axis and such that a resolver is provided between the support member and the rotor in the axial direction,
wherein the support member is provided with a cylindrical-tubular-shaped resolver holder which protrudes toward the rotor such that a resolver stator of the resolver is held in a predetermined position by the resolver holder,
wherein the cylindrical-tubular-shaped resolver holder is provided with a plurality of slits which are arranged in the circumferential direction about the axis and which extend in the axial direction, and
wherein each of at least one of the slits is located in a position coincident with at least one of the grooves in the circumferential direction about the axis.

2. The rotary electric machine according to claim 1,
wherein a number of the grooves provided in the resin surfaces of the respective mold resin portions is different from a number of the teeth provided in the stator core.

3. The rotary electric machine according to claim 1,
wherein the resin surfaces of the respective mold resin portions include at least two resin surfaces that are different from each other in terms of a number of the grooves provided in each of the at least two resin surfaces.

* * * * *